(12) United States Patent
Yamaguchi et al.

(10) Patent No.: US 9,791,893 B2
(45) Date of Patent: Oct. 17, 2017

(54) ELECTRONIC DEVICE AND METHOD OF ASSEMBLING THE ELECTRONIC DEVICE

(71) Applicant: FUJITSU LIMITED, Kawasaki-shi, Kanagawa (JP)

(72) Inventors: Shingo Yamaguchi, Kawasaki (JP); Satoshi Watanabe, Setagaya (JP); Hayato Shida, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 7 days.

(21) Appl. No.: 14/725,415

(22) Filed: May 29, 2015

(65) Prior Publication Data
US 2016/0011629 A1    Jan. 14, 2016

(30) Foreign Application Priority Data

Jul. 10, 2014 (JP) .................. 2014-141962

(51) Int. Cl.
*G06F 1/16* (2006.01)
(52) U.S. Cl.
CPC .................. *G06F 1/1656* (2013.01)
(58) Field of Classification Search
CPC .................................... G06F 1/1656
USPC .................................... 361/679.01
See application file for complete search history.

(56) References Cited

U.S. PATENT DOCUMENTS

| | | | | | |
|---|---|---|---|---|---|
| 4,375,323 | A * | 3/1983 | Inagaki | .................. | G03B 17/08 396/27 |
| 7,257,003 | B2 * | 8/2007 | Ono | .................. | H05K 9/0015 174/16.1 |
| 7,975,870 | B2 * | 7/2011 | Laule | .................. | B60K 15/077 220/582 |
| 2011/0211300 | A1 * | 9/2011 | Mori | .................. | G06F 1/1656 361/679.01 |
| 2012/0008266 | A1 * | 1/2012 | Nomura | .................. | G06F 3/0414 361/679.01 |
| 2012/0287566 | A1 * | 11/2012 | Shiogama | .................. | G02F 1/133308 361/679.01 |
| 2012/0314354 | A1 * | 12/2012 | Rayner | .................. | H01H 13/06 361/679.01 |

FOREIGN PATENT DOCUMENTS

JP         08-078864 A    3/1996

* cited by examiner

*Primary Examiner* — Tuan T Dinh
*Assistant Examiner* — Rockshana Chowdhury
(74) *Attorney, Agent, or Firm* — Squire Patton Boggs (US) LLP

(57) ABSTRACT

An electronic device includes a first housing component including a side wall portion surrounding an electronic component; a concave portion provided in the side wall portion of the first housing component; a second housing component whose edge portion is arranged on the side wall portion of the first housing component; a seal member which has elasticity and waterproofness and which is arranged between the side wall portion of the first housing component and the edge portion of the second housing component; and a fixing component which includes a first claw portion that comes into contact with an upper surface of the edge portion of the second housing component and a second claw portion that fits into the concave portion of the side wall portion of the first housing component and which fixes the second housing component onto the first housing component by the first claw portion.

12 Claims, 16 Drawing Sheets

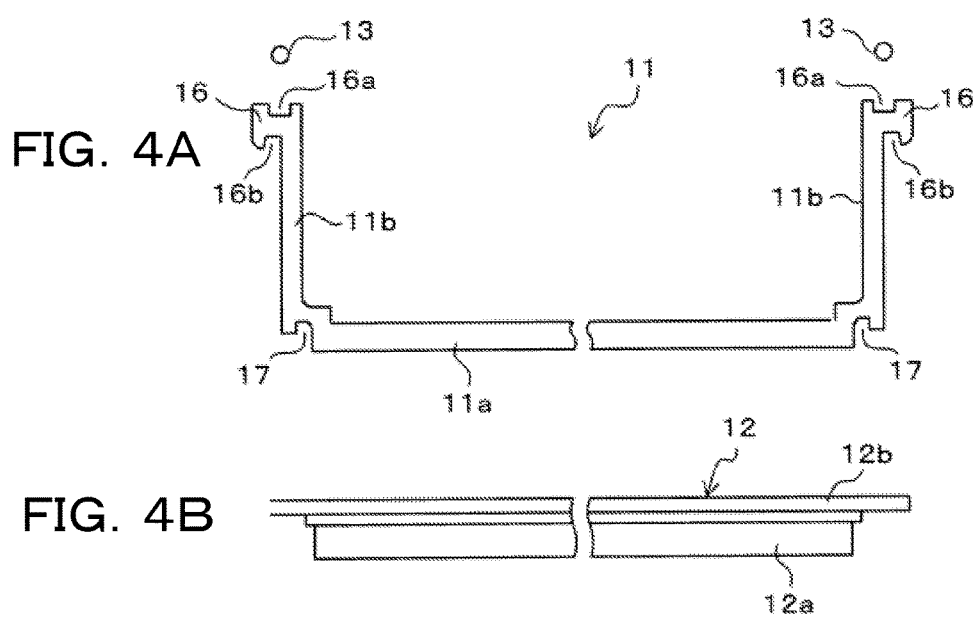
FIG. 4A
FIG. 4B
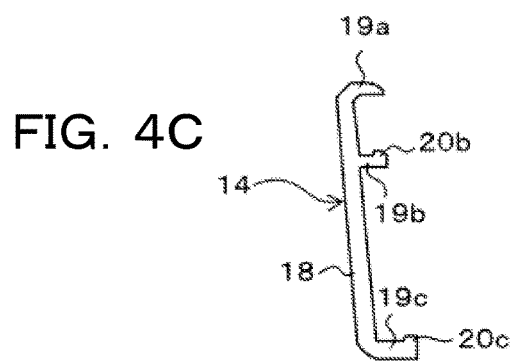
FIG. 4C

ELECTRONIC DEVICE AND METHOD OF ASSEMBLING THE ELECTRONIC DEVICE

CROSS-REFERENCE TO RELATED APPLICATION

This application is based upon and claims the benefit of priority of the prior Japanese Patent Application No. 2014-141962, filed on Jul. 10, 2014, the entire contents of which are incorporated herein by reference.

FIELD

The embodiment discussed herein is related to an electronic device and a method of assembling the electronic device.

BACKGROUND

In recent years, reduction in size and thickness of electronic devices such as a mobile phone, a smartphone, and a digital camera is promoted. Waterproofness is often desired for these electronic devices.

As a method of realizing the waterproofness of electronic devices, Japanese Laid-open Patent Publication No. 8-78864 discloses a method in which a seal member such as rubber packing or elastomer is inserted between two components that form a housing (hereinafter referred to as "housing components") and the housing components are fastened together by screws. Further, a method is disclosed in which two housing components are fastened together by snap-fits instead of screws.

Further, there is a method in which two housing components are bonded together by an adhesive agent or a curable sealing agent in order to suppress water intrusion.

SUMMARY

In accordance with an aspect of the embodiments, an electronic device includes a first housing component including a side wall portion surrounding an electronic component; a concave portion provided in the side wall portion of the first housing component; a second housing component whose edge portion is arranged on the side wall portion of the first housing component; a seal member which has elasticity and waterproofness and which is arranged between the side wall portion of the first housing component and the edge portion of the second housing component; and a fixing component which includes a first claw portion that comes into contact with an upper surface of the edge portion of the second housing component and a second claw portion that fits into the concave portion of the side wall portion of the first housing component and which fixes the second housing component onto the first housing component by the first claw portion and the second claw portion.

The object and advantages of the invention will be realized and attained by means of the elements and combinations particularly pointed out in the claims. It is to be understood that both the foregoing general description and the following detailed description are exemplary and explanatory and are not restrictive of the invention, as claimed.

BRIEF DESCRIPTION OF DRAWINGS

These and/or other aspects and advantages will become apparent and more readily appreciated from the following description of the embodiments, taken in conjunction with the accompanying drawing of which:

FIGS. 4A to 4C are schematic cross-sectional views respectively illustrating a first housing component, a second housing component, and a fixing component.

DESCRIPTION OF EMBODIMENT

Prior to the description of an embodiment, preliminary matters will be described for ease of understanding of the embodiment.

As described above, as the method of realizing the waterproofness of electronic devices, there are a method in which a seal member is inserted between two housing components and the housing components are fastened together by screws or snap-fits and a method in which two housing components are bonded together by an adhesive agent or a curable sealing agent.

In the method that uses screws or snap-fits, when one of the housing components is a thin plate of metal or glass, if a distance between the screws or the snap-fits to be arranged is large, the metal plate or the glass plate bends and a gap occurs between the plate and the seal member. As a result, the waterproofness of the electronic device may not be ensured.

When the screws or the snap-fits are arranged at small pitches, it is possible to reduce the bend of the metal plate or the glass plate and to ensure the waterproofness of the electronic device. However, when the number of screws or snap-fits increases, the assembly operation of the electronic device becomes complicated. Further, many screws or snap-fits are removed in the event of repair, so that the workability of the repair is bad.

Further, the snap-fit is desired to have appropriate elasticity, so that the snap-fit is usually formed of a resin. However, when the housing component is metal or glass, the snap-fit is not able to be formed integrally with the housing component, so that a process for joining a separately formed snap-fit (resin) to a portion of metal or glass is used. Therefore, the number of manufacturing processes increases and it causes increase in manufacturing cost.

On the other hand, in the method in which two housing components are bonded together by an adhesive agent or a curable sealing agent, it is difficult to disassemble the housing in the event of repair. Further, it takes a certain amount of time for the adhesive agent or the sealing agent to be cured, so that there is a disadvantage that the time used for the manufacturing is long.

In the embodiment described below, an electronic device including a waterproof structure where workability of assembling and repair is good and a method of assembling the electronic device will be described.

Embodiment

Figure 1:
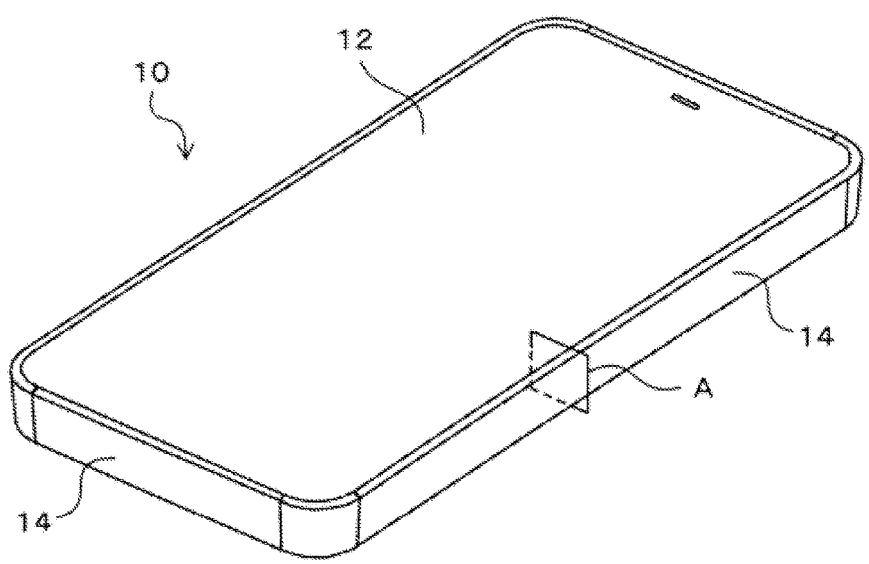
FIG. 1 is a perspective view illustrating an electronic device according to an embodiment.
Figure 2:
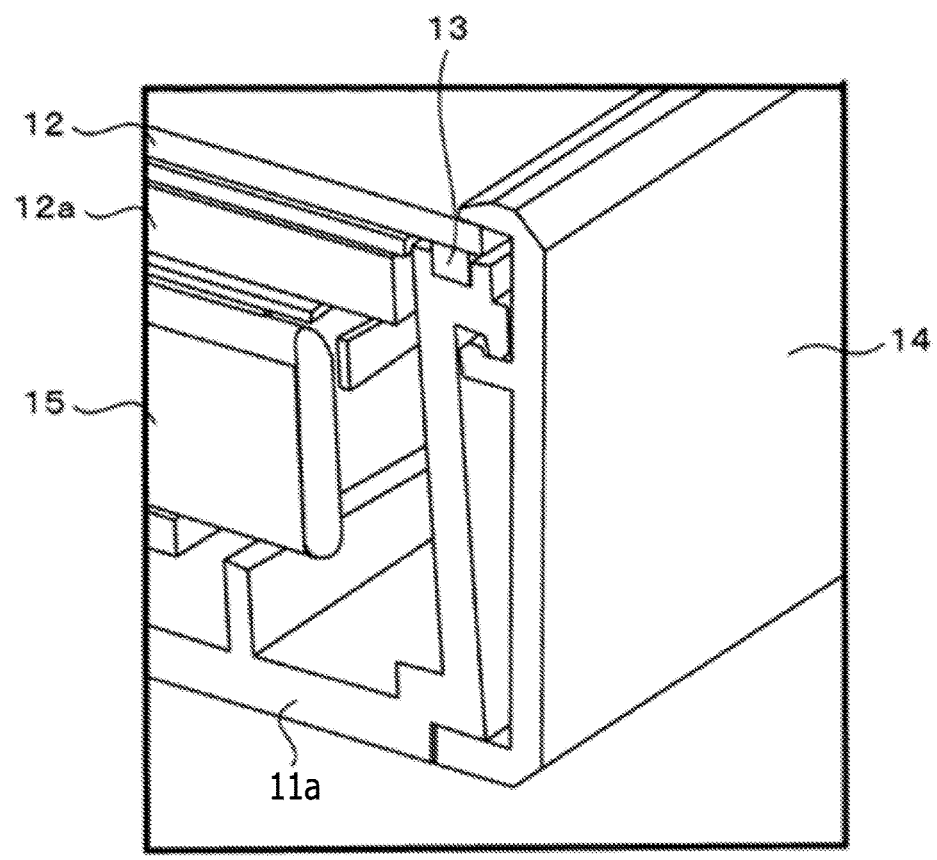
FIG. 2 is a perspective cross-sectional view illustrating a surface indicated by symbol A in FIG. 1.
Figure 3:
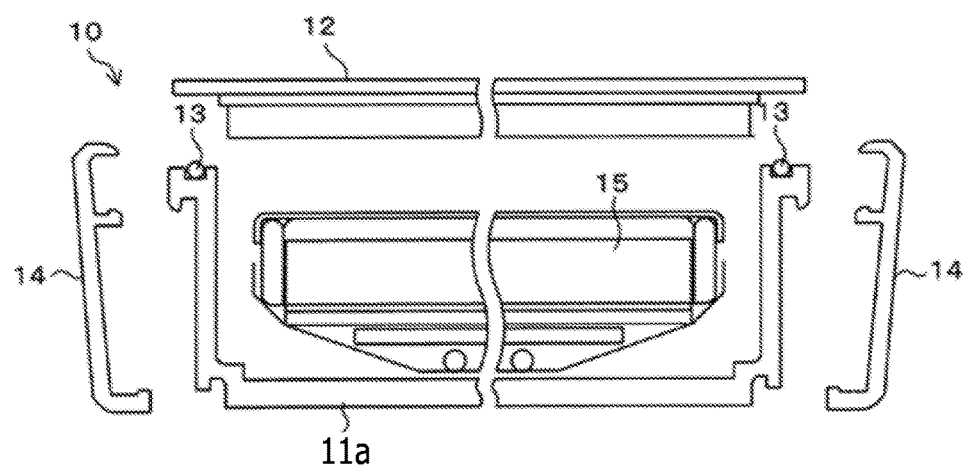
FIG. 3 is an assembly drawing of the electronic device according to the embodiment.
Figure 5:
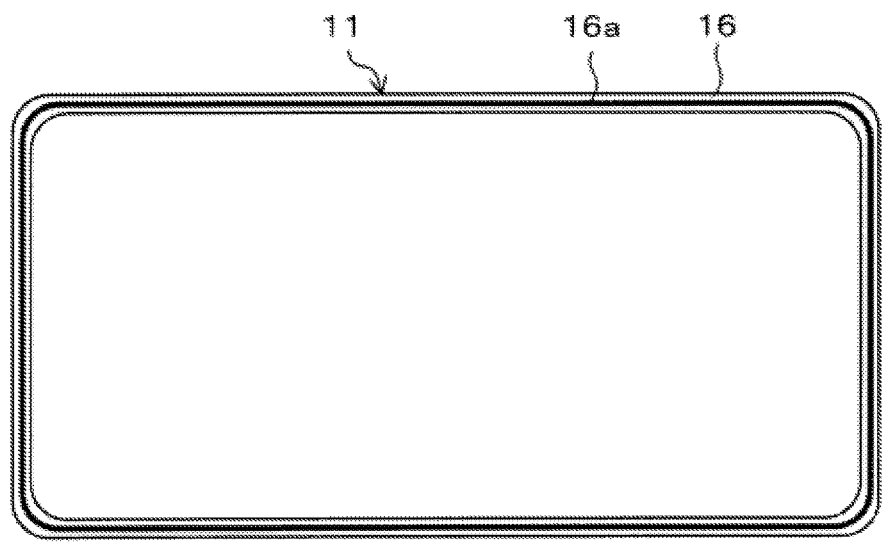
FIG. 5 is a top view of the first housing component.

FIG. 1 is a perspective view illustrating the electronic device according to the embodiment. FIG. 2 is a perspective cross-sectional view of a portion indicated by symbol A in FIG. 1. FIG. 3 is an assembly drawing of the electronic device according to the embodiment. FIGS. 4A to 4C are schematic cross-sectional views respectively illustrating a first housing component 11, a second housing component 12, and a fixing component 14. FIG. 5 is a top view of the first housing component 11.

In the present embodiment, a case is described in which the electronic device is a smartphone. However, the disclosed technique may be applied to other electronic devices.

A housing of an electronic device 10 includes a first housing component 11 and a second housing component 12, which form a space in which an electronic component 15 is arranged, and a seal member 13 and a fixing component 14, which ensure waterproofness between the first housing component 11 and the second housing component 12. The electronic component 15 is, for example, a circuit board on which an integrated circuit (IC) and the like are mounted and a rechargeable battery.

As illustrated in FIG. 4A, the first housing component 11 is a box-shaped member including a bottom plate portion 11a having a substantially rectangular plate shape and a side plate portion 11b surrounding the bottom plate portion 11a.

A frame portion 16 protruding toward outside is provided at an upper portion of the side plate portion 11b. Further, a groove 16a in which the seal member 13 is arranged is provided on the upper surface of the frame portion 16. As illustrated in FIG. 5, the groove 16a is formed in a closed ring shape along the frame portion 16 when the housing component 11 is seen from above.

As illustrated in FIG. 4A, a concave portion 16b, into which a tip portion of a second claw portion 19b of the fixing component 14 described later fits, is provided on the lower side of the frame portion 16. Further, a concave portion 17, into which a tip portion of a third claw portion 19c of the fixing component 14 fits, is provided on the lower side of the side plate portion 11b. A plurality of concave portions 16b and a plurality of concave portions 17 are provided along the outer circumferential direction of the first housing component 11.

In the present embodiment, it is assumed that the first housing component 11 is integrally formed of a resin (plastic).

The seal member 13 is a closed ring-shaped member formed of a material having elasticity and waterproofness and is arranged on the frame portion 16 of the first housing component 11 as described above. As the seal member 13, for example, an O-ring formed of silicon rubber or a soft gasket may be used. Alternatively, as the seal member 13, a sealing agent which has elasticity after being coated and which is easily peeled off and easily recoated may be used.

The groove 16a may not be provided on the side plate portion 11b (the frame portion 16). However, it is preferable to provide the groove 16a at an upper portion of the side plate portion 11b (the frame portion 16) in order to easily arrange the seal member 13 at a predetermined position.

The second housing component 12 is a member in which at least the edge portion has a thin plate shape. In the present embodiment, as the second housing component 12, as illustrated in FIG. 4B, a touch panel in which a liquid crystal display unit 12a and a touch pad unit 12b are integrated together is used. An edge portion of the touch pad unit 12b is arranged on the frame portion 16 of the first housing component 11. As illustrated in FIG. 2, the liquid crystal display unit 12a is arranged in the first housing component 11.

The fixing component 14 is a component that sandwiches the frame portion 16 of the first housing component 11 and the edge portion of the second housing component 12. The first housing component 11 and the second housing component 12 are separately formed. As illustrated in FIGS. 1 and 2, a plurality of fixing components 14 are arranged so as to cover the periphery of the first housing component 11. In the present embodiment, it is assumed that the fixing component 14 is formed of the same resin as that of the first housing component 11.

As illustrated in FIG. 4C, the fixing component 14 includes a cover portion 18 that covers the side surface of the first housing component 11, and a first claw portion 19a, a second claw portion 19b, and a third claw portion 19c which extend from the cover portion 18 in the horizontal direction.

The first claw portion 19a is connected to the upper end of the cover portion 18. The first claw portion 19a is continuously formed along the longitudinal direction of the cover portion 18 and is in contact with the upper side of the edge portion of the second housing component 12 (the touch pad unit 12b) as illustrated in FIG. 2.

The second claw portion 19b is arranged below the first claw portion 19a. A convex portion 20b protruding upward is provided at the tip portion of the second claw portion 19b. The convex portion 20b fits into the concave portion 16b of the first housing component 11, so that it is suppressed that the fixing component 14 is detached from the first housing component 11.

The third claw portion 19c is connected to the lower end of the cover portion 18. A convex portion 20c protruding upward is provided at the tip portion of the third claw portion 19c. The convex portion 20c fits into the concave portion 17 at a lower portion of the side plate portion 11b, so that it is more difficult for the fixing component 14 to be detached from the first housing component 11.

Figure 6:
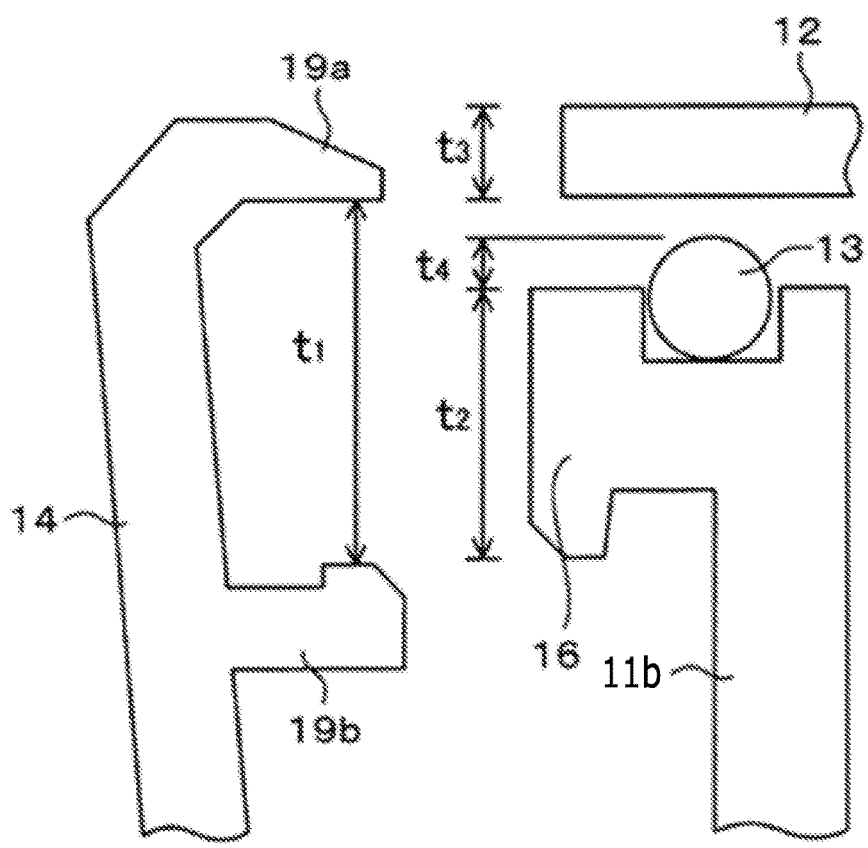
FIG. 6 is a diagram illustrating a relationship among a distance t1 between a first claw portion and a second claw portion, a thickness t2 of a frame portion, a thickness t3 of an edge portion of a second housing component, and a protrusion amount t4 of a seal member from the frame portion.

When, as illustrated in FIG. 6, the distance between the first claw portion 19a and the second claw portion 19b is t1, the thickness of the frame portion 16 is t2, the thickness of the edge portion of the second housing component 12 is t3, and the protrusion amount of the seal member 13 from the frame portion 16 is t4, it is important to satisfy the following inequality expression (1). Here, t4 is the protrusion amount from the frame portion 16 when no stress is applied to the seal member 13.

$$(t2+t3)<t1<(t2+t3+t4) \qquad (1)$$

Hereinafter, the method of assembling the electronic device according to the present embodiment will be described with reference to FIGS. 7A, 7B, 8A, 8B, and 9 to 11.

Figure 7A:
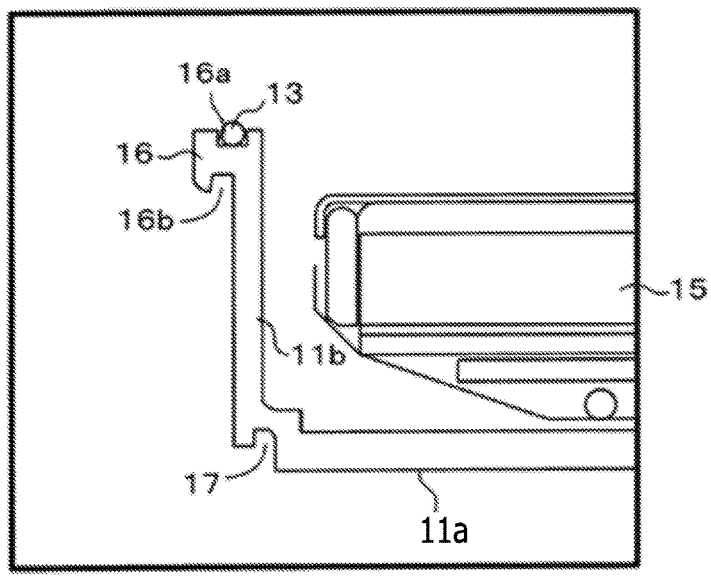
FIGS. 7A and 7B are diagrams (No. 1) for explaining a method of assembling the electronic device according to the embodiment.

First, as illustrated in FIG. 7A, the electronic component 15 is arranged in the first housing component 11. Further, the seal member 13 is arranged in the groove 16a of the first housing component 11.

Figure 7B:
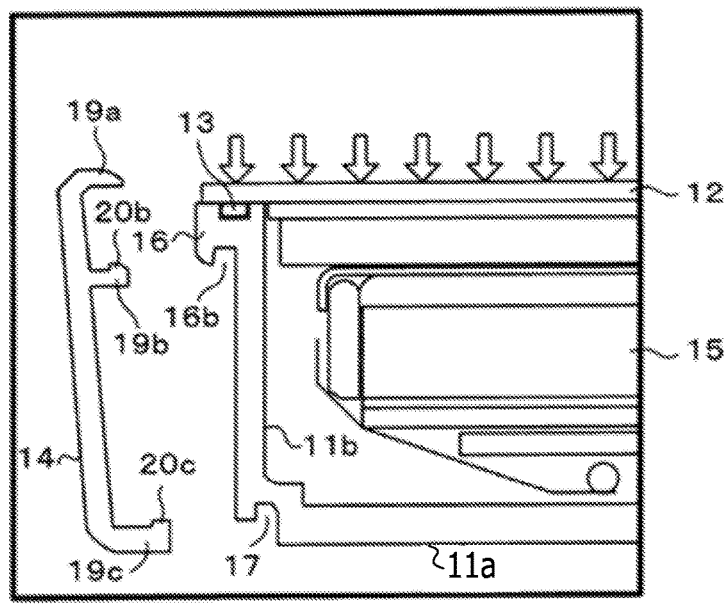
Figure 9:
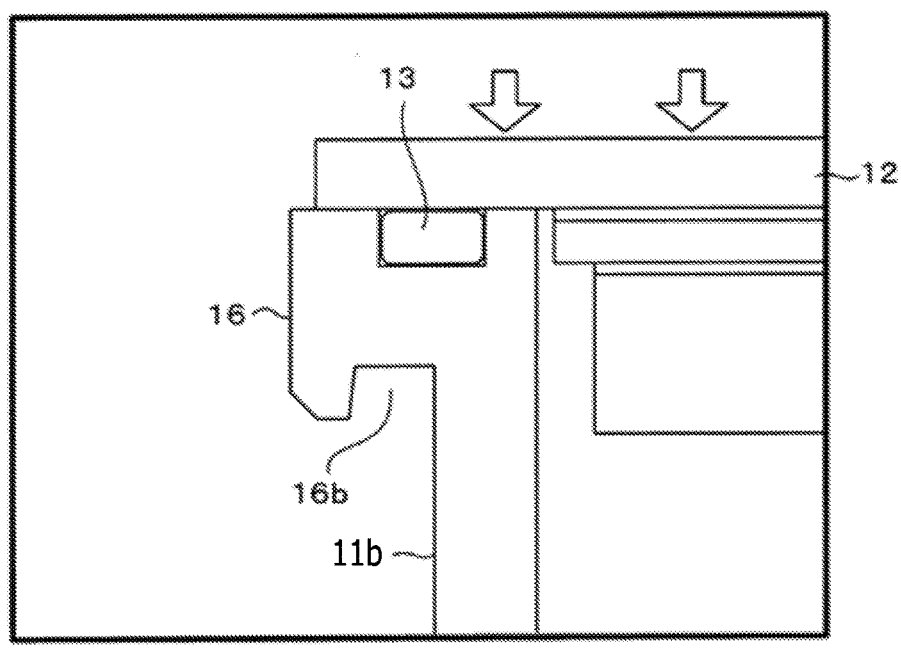
FIG. 9 is a diagram (No. 3) for explaining the method of assembling the electronic device according to the embodiment.

Next, as illustrated in FIG. 7B, the second housing component 12 is arranged on the first housing component 11 and the second housing component 12 is uniformly pressed from above to compress the seal member 13. FIG. 9 is an enlarged diagram illustrating a state in which the seal member 13 is compressed. In the example illustrated in FIG. 9, the seal member 13 is compressed until the first housing component 11 (the frame portion 16) and the edge portion of the second housing component 12 come into contact with each other.

Figure 8A:
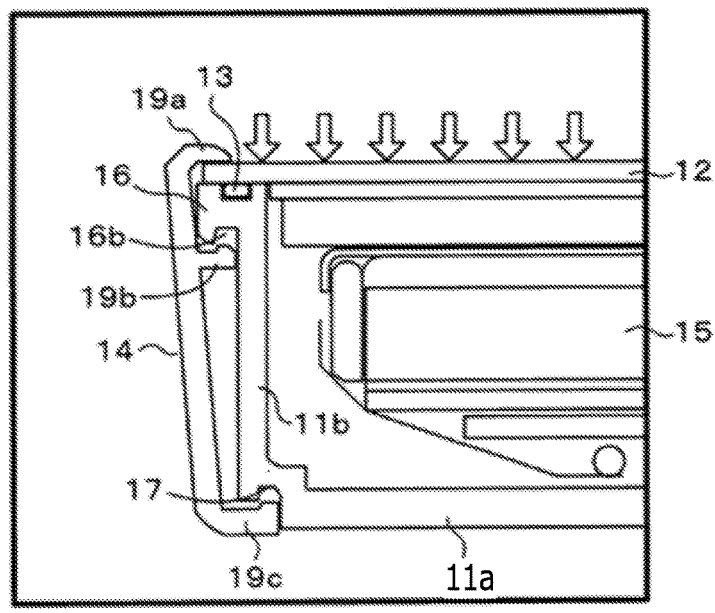
FIGS. 8A and 8B are diagrams (No. 2) for explaining the method of assembling the electronic device according to the embodiment.

Next, as illustrated in FIGS. 7B and 8A, the fixing component 14 is moved in the horizontal direction to the side of the first housing component 11, and the frame portion 16 of the first housing component 11 and the edge portion of the second housing component 11 are inserted between the claw portions 19a and 19b of the fixing component 14.

At this time, the convex portion 20b of the second claw portion 19b is arranged at a position corresponding to the concave portion 16b of the first housing component 11 and the convex portion 20c of the third claw portion 19c is arranged at a position corresponding to the concave portion 17 of the first housing component 11.

As described above, the distance t1 between the first claw portion 19a and the second claw portion 19b is set to be greater than the sum of the thickness t2 of the frame portion 16 and the thickness t3 of the edge portion of the second housing component 12 (see the expression (1)). Therefore, when the fixing component 14 is moved in the horizontal direction to the side of the first housing component 11, it is possible to insert the frame portion 16 and the edge portion of the second housing component 12 between the first claw portion 19a and the second claw portion 19b.

Figure 10:
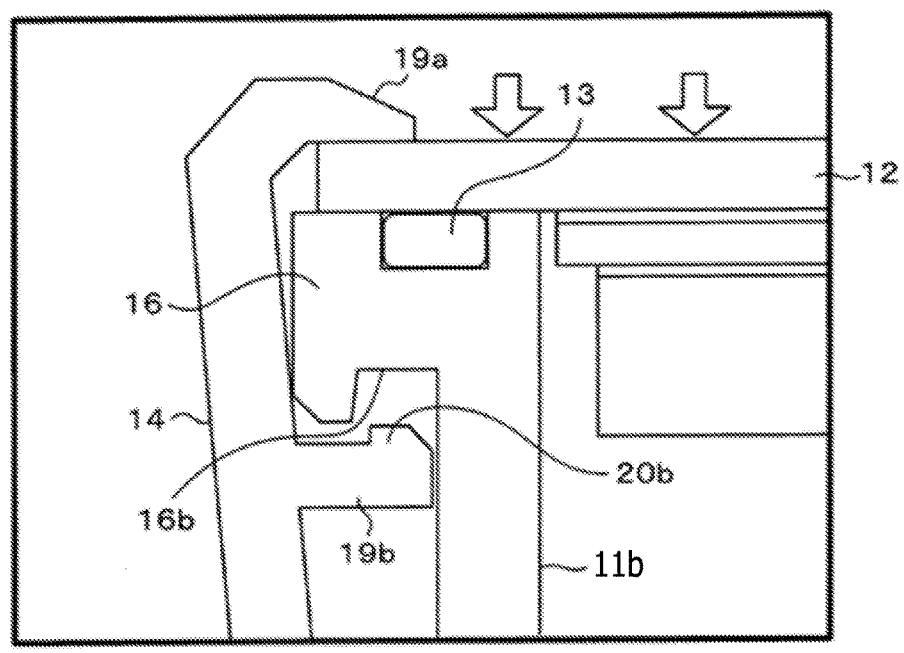
FIG. 10 is a diagram (No. 4) for explaining the method of assembling the electronic device according to the embodiment.

FIG. 10 illustrates a state in which the frame portion 16 and the edge portion of the second housing component 12 are inserted between the claw portion 19a and the claw portion 19b in a state in which the seal member 13 is compressed.

For example, when two members are fixed together by a snap-fit, the snap-fit is elastically defoimed, so that excessive stress may be applied to the snap-fit may be damaged. However, in the present embodiment, when the electronic device 10 is assembled, the fixing component 14 is not elastically deformed. Therefore, when the frame portion 16 and the edge portion of the second housing component 12 are inserted between the first claw portion 19a and the second claw portion 19b, the risk of damage to the fixing component 14 is very small.

Figure 8B:
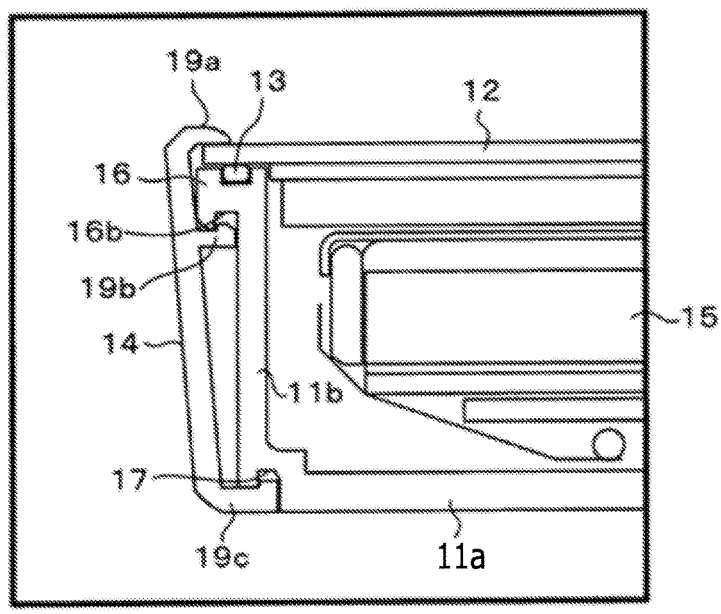
Figure 11:
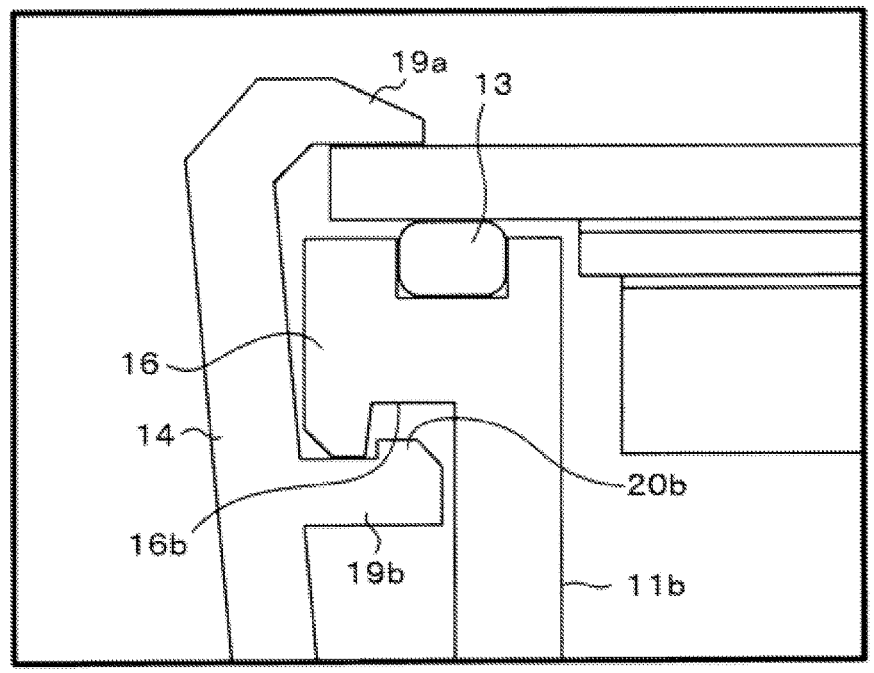
FIG. 11 is a diagram (No. 5) for explaining the method of assembling the electronic device according to the embodiment.

Next, the stress applied to the second housing component 12 is removed. Then, as illustrated in FIG. 11, the fixing component 14 and the second housing component 12 are moved upward by an elastic force (repulsive force) of the seal member 13. Then, as illustrated in FIG. 8B, the tip portions (the convex portions 20b and 20c) of the second claw portion 19b and the third claw portion 19c fit into the concave portions 16b and 17 of the first housing component 11, respectively. Thereby, the waterproofness between the first housing component 11 and the second housing component 12 is ensured and the fixing component 14 is not easily detached from the first housing component 11 and the second housing component 12, so that the assembling of the electronic device 10 is completed.

When the electronic device 10 is disassembled in the event of an operation such as repair, a gap is formed between the first claw portion 19a of the fixing component 14 and the second housing component 12 by pressing the second housing component 12 as illustrated in FIG. 8A and the fixing component 14 is moved downward. Thereafter, as illustrated in FIG. 7B, the fixing component 14 is moved outward in the horizontal direction. Subsequently, the second housing component 12 is removed upward from the first housing component 11. Thereby, it is possible to repair or replace the electronic component 15.

As described above, according to the method of assembling the electronic device according to the present embodiment, the frame portion 16 and the edge portion of the second housing component 12 are clamped by the fixing component 14 in a state in which the seal member 13 is compressed, so that the first housing component 11 and the second housing component 12 are fixed together. Therefore, the time used to assemble the electronic device is shorter than that in a case in which screws, snap-fits, or an adhesive agent are used, so that it is preferred for mass production of the electronic device. Further, in the method of assembling the electronic device according to the present embodiment, the frame portion 16 of the first housing component 11 and the edge portion of the second housing component 12 are clamped by the fixing component 14 and thereby both housing components are fixed together. Therefore, the method of assembling the electronic device according to the present embodiment may be applied regardless of the materials of the first housing component 11 and the second housing component 12.

Further, according to the method of assembling the electronic device according to the present embodiment, when repairing the electronic device 10, it is possible to easily separate the first housing component 11 and the second housing component 12 from each other by pulling out the fixing component 14 in a state in which pressure is applied to the second housing component 12. Therefore, there is an advantage that the repair of the electronic device 10 may be easily performed. In this case, the fixing component 14 may be used again when assembling the electronic device 10.

Further, the adhesion between the frame portion 16 and the seal member 13 and the adhesion between the seal member 13 and the second housing component 12 are determined by the distance between the first claw portion 19a and the second claw portion 19b of the fixing component 14 and the elastic force of the seal member 13. Therefore, in the present embodiment, the adhesion between the frame portion 16 and the seal member 13 and the adhesion between the seal member 13 and the second housing component 12 are substantially uniform over the entire length direction, so that it is possible to obtain good waterproof performance and dustproof performance.

By the way, it is preferable that the seal member 13 and the first claw portion 19a overlap with each other when seen from above.

Figure 12A:
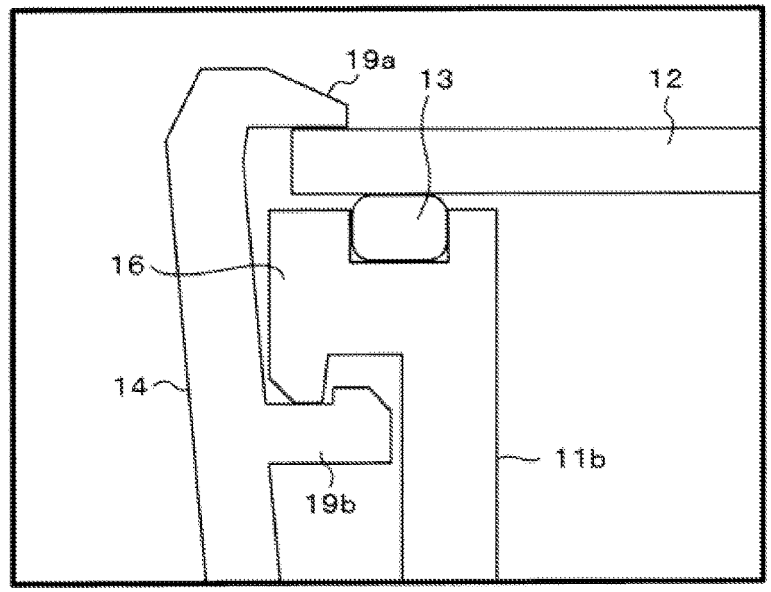
FIG. 12A is a cross-sectional view illustrating an example of a state in which a frame portion of the first housing component and the edge portion of the second housing component are clamped by the fixing component.
Figure 12B:
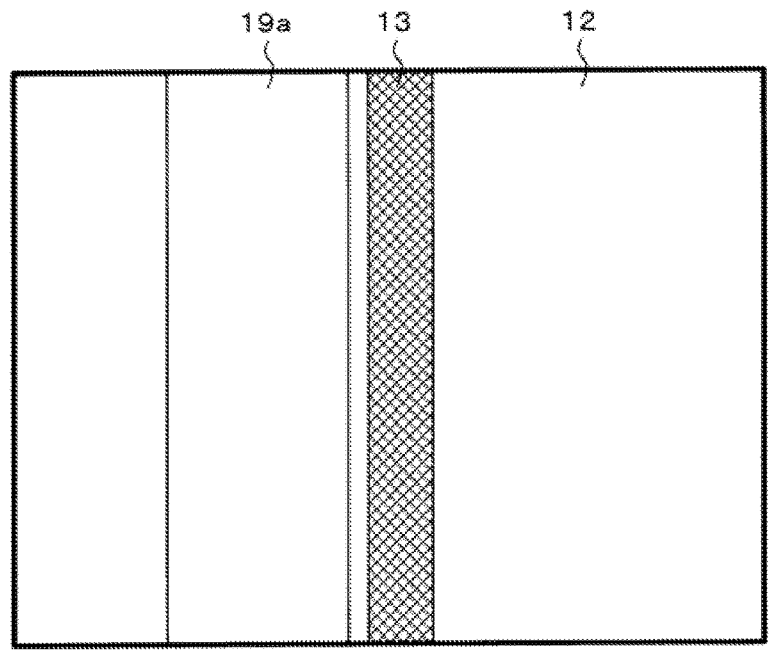
FIG. 12B is a top view of FIG. 12A.

FIG. 12A is a cross-sectional view illustrating an example of a state in which the frame portion 16 of the first housing component 11 and the edge portion of the second housing component 12 are clamped by the fixing component 14. FIG. 12B is a top view of FIG. 12A. In FIG. 12B, cross-hatching is applied to a contact surface between the seal member 13 and the first and the second housing components 11 and 12.

In the example illustrated in FIGS. 12A and 12B, the length of the first claw portion 19a of the fixing component 14 is short, so that the seal member 13 and the first claw portion 19a do not overlap with each other when seen from above. In this case, a bend is generated at the edge portion of the second housing component 12 by the elastic force of the seal member 13, so that the edge portion of the second housing component 12 may be damaged and the waterproofness may not be assured.

Figure 13A:
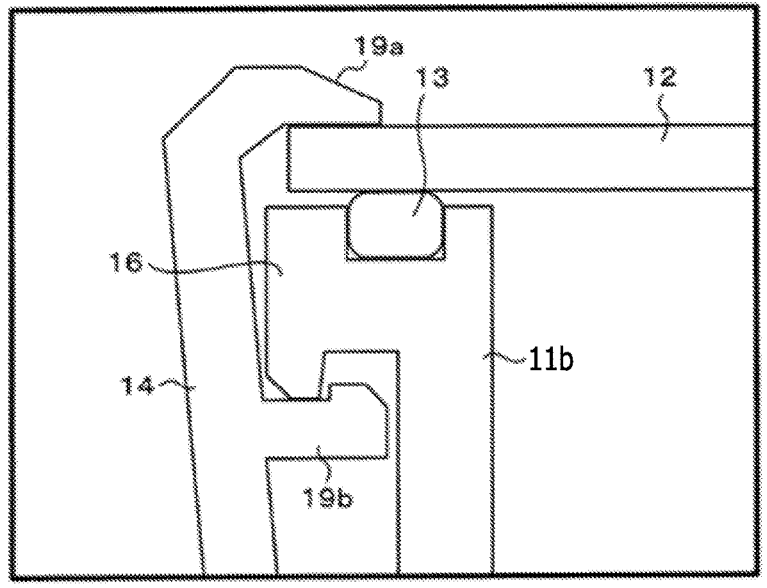
FIG. 13A is a cross-sectional view illustrating another example of the state in which the frame portion of the first housing component and the edge portion of the second housing component are clamped by the fixing component.
Figure 13B:
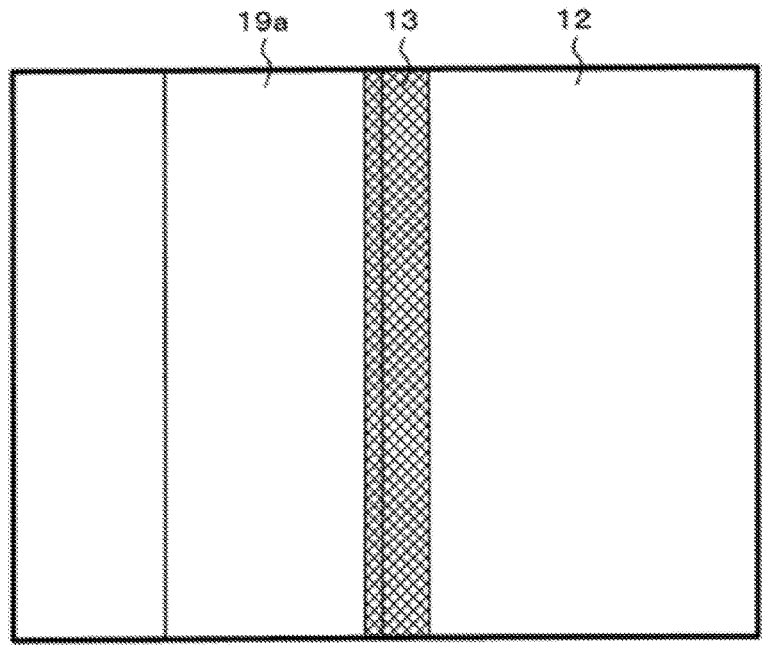
FIG. 13B is a top view of FIG. 13A.

FIG. 13A is a cross-sectional view illustrating another example of a state in which the frame portion 16 of the first housing component 11 and the edge portion of the second housing component 12 are clamped by the fixing component 14. FIG. 13B is a top view of FIG. 13A. In FIG. 13B, cross-hatching is applied to a contact surface between the seal member 13 and the first and the second housing components 11 and 12.

In the example illustrated in FIGS. 13A and 13B, the seal member 13 and the first claw portion 19a overlap with each other when seen from above. In this case, the first claw portion 19a is located above the seal member 13 in the vertical direction, so that no bend is generated at the edge portion of the second housing component 12 by the elastic force of the seal member 13. Therefore, damage of the second housing component 12 and degradation of the waterproofness due to the elastic force of the seal member 13 are avoided.

Modified Example

In the example illustrated in FIG. 2, the first claw portion 19a protrudes on the edge portion of the second housing component 12.

Figure 14:
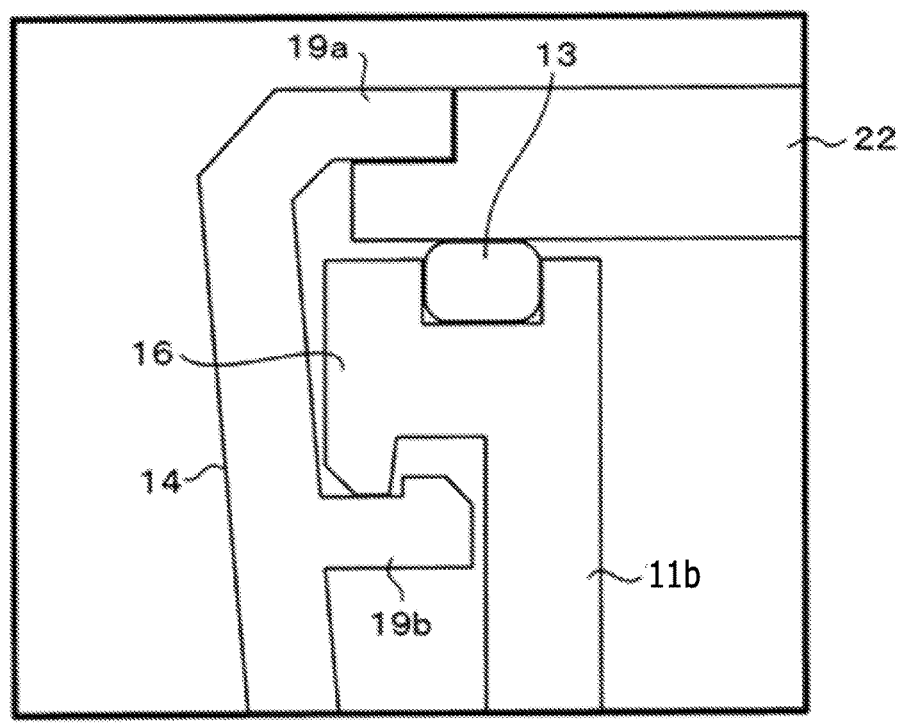
FIG. 14 is a diagram illustrating a modified example (No. 1)

On the other hand, in a first modified example illustrated in FIG. 14, a level difference is provided at the edge portion of a second housing component 22 and the upper surface of the first claw portion 19a and the upper surface of the second housing component 22 are located on the same plane.

Figure 15:
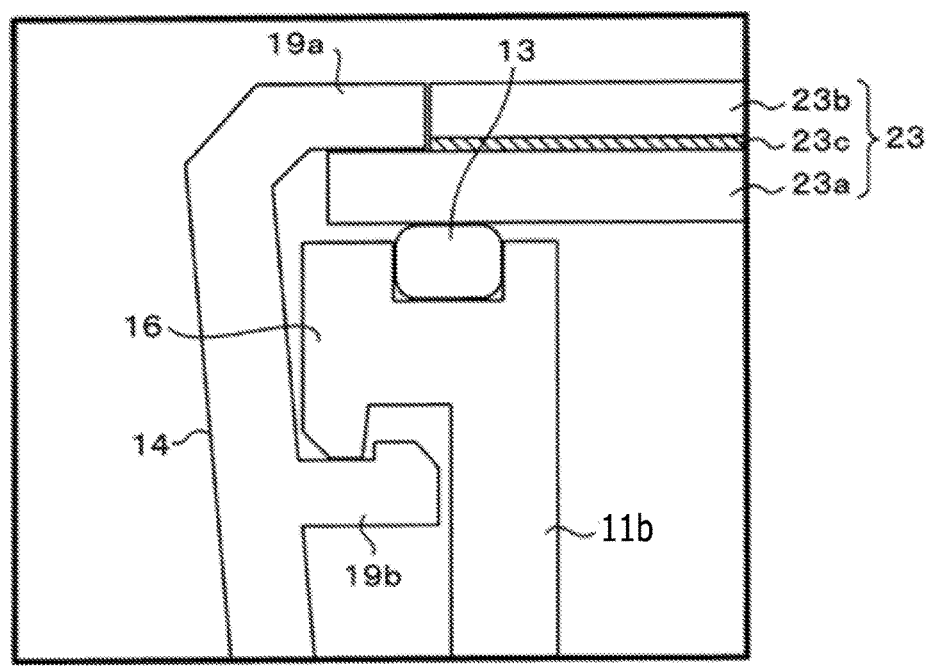
FIG. 15 is a diagram illustrating a modified example (No. 2)

When it is difficult to provide a level difference at the edge portion of the second housing component 22 as in FIG. 14, as illustrated in FIG. 15, a level difference may be provided to a second housing component 23 by bonding together two flat plates 23a and 23b by an adhesive agent 23c.

Figure 16:
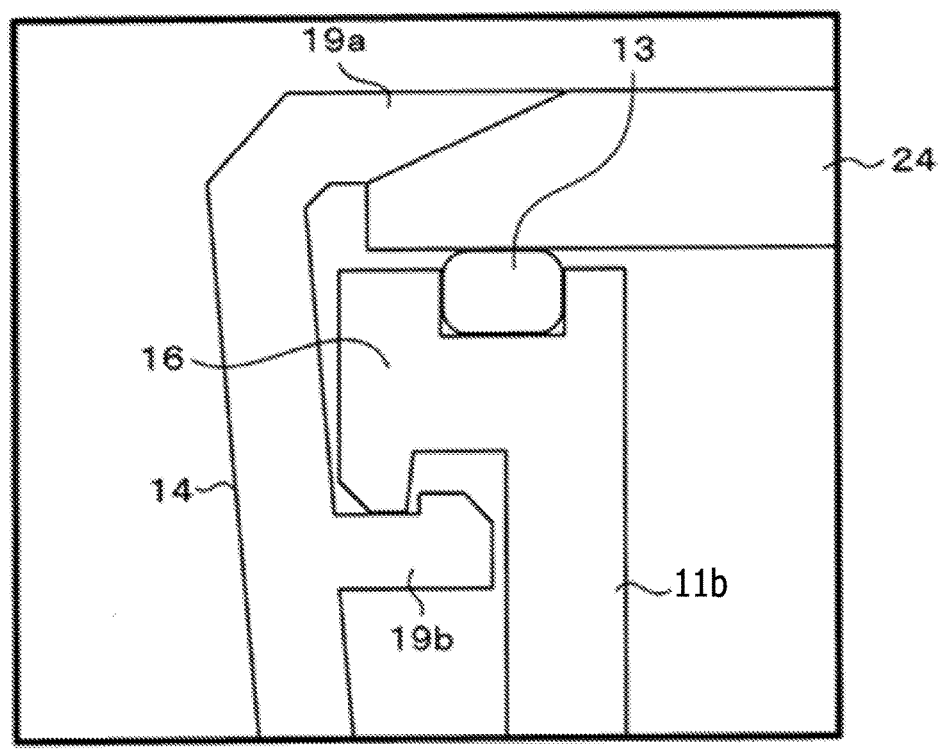
FIG. 16 is a diagram illustrating a modified example (No. 3).

Further, as illustrated in FIG. 16, the upper surface of the first claw portion 19a and the upper surface of a second housing component 24 may be located on the same plane by providing a slope at the edge portion of the second housing component 24 and forming the first claw portion 19a to have a shape corresponding to the slope of the second housing component 24.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. An electronic device comprising:
   a first housing component including a side wall portion surrounding an electronic component;
   a first concave portion provided in the side wall portion of the first housing component;
   a second housing component whose edge portion is arranged on the side wall portion of the first housing component;
   a seal member which has elasticity and waterproofness and which is arranged between the side wall portion of the first housing component and the edge portion of the second housing component; and
   a fixing component which includes a first claw portion that comes into contact with an upper surface of the edge portion of the second housing component, and a second claw portion that fits into the first concave portion of the side wall portion of the first housing component and which fixes the second housing component onto the first housing component by the first claw portion and the second claw portion, sandwiching the edge portion of the second housing component and the side wall portion of the first housing component between the first claw portion and the second claw portion from an outside of the first housing component and the second housing component, and
   wherein a lower surface of the edge portion of the second housing component is in contact with an upper surface of the side wall portion of the first housing component,
   wherein an upper surface of the fixing component is not in contact with the second housing component and a lower surface of the fixing component are not in contact with the first housing component.

2. The device according to claim 1,
   wherein the fixing component is removable from the first housing component and the second housing component by applying pressure to the second housing component and compressing the seal member.

3. The device according to claim 1,
   wherein the side wall portion includes a frame portion protruding laterally at an upper part of the side wall portion, and
   wherein the first concave portion is provided on a lower side of the frame portion in such a manner that an opening of the first concave portion faces downward.

4. The device according to claim 3,
   wherein the frame portion has a groove in which the seal member is arranged.

5. The device according to claim 1,
   wherein the seal member is arranged in a ring shape along the side wall portion of the first housing component.

6. The device according to claim 1,
   wherein the fixing component further includes a cover portion which covers the side wall portion of the first housing component and which is connected to the first claw portion and the second claw portion.

7. A method of assembling an electronic device, the method comprising:
   arranging a seal member having elasticity and waterproofness into a first concave portion provided on a side wall portion of a first housing component that includes the side wall portion surrounding an electronic component;
   arranging a second housing component on the first housing component in such a manner that a lower surface of the second housing component covers the first concave portion and comes into contact with an upper surface of the first housing component around the first concave portion;

applying pressure to the second housing component and compressing the seal member;

using a fixing component including a first claw portion and a second claw portion, causing the first claw portion to come into contact with an upper surface of an edge portion of the second housing component, and arranging a tip portion of the second claw portion to a position corresponding to a second concave portion provided in the side wall portion of the first housing component;

fixing the second housing component onto the first housing component by the first claw portion and the second claw portion sandwiching the edge portion of the second housing component and the side wall portion of the first housing component between the first claw portion and the second claw portion from an outside of the first housing component and the second housing component; and removing the pressure applied to the second housing component and fitting the tip portion of the second claw portion into the second concave portion by a repulsive force of the seal member in such a manner the first claw portion and the second claw portion sandwich the edge portion of the second housing component and the side wall portion of the first housing component, wherein an upper surface of the fixing component is not in contact with the second housing component and a lower surface of the fixing component are not in contact with the first housing component.

8. The method according to claim 7, further comprising: satisfying $(t2+t3)<t1<(t2+t3+t4)$ when a distance between the first claw portion and the second claw portion is t1, a distance from an upper surface of the side wall portion to the second concave portion is t2, a thickness of the edge portion of the second housing component is t3, and a protrusion amount of the seal member from the upper surface of the side wall portion is t4.

9. The device according to claim 1, wherein the first housing component includes a lower portion which extends from the side wall portion and is provided on a lower side of the first housing, and the edge portion of the second housing component is provided in such a manner that the edge portion comes into contact with an end surface of the side wall provided on an opposite side to the lower portion.

10. The device according to claim 1, wherein the second claw portion projects from a longitudinal surface of the fixing component and includes a claw which projects from a tip portion of the second claw portion along a surface of the side wall portion and fits into to the first concave portion.

11. The device according to claim 1, wherein the fixing component includes a third claw portion which is provided on an opposite side to the first claw portion and fits into a second concave portion provided in the side wall portion on an opposite side to the first concave portion.

12. The device according to claim 1, wherein the seal member is provided in a third concave portion which is provided in the side wall portion of the first housing component in such a manner that an opening of the third concave portion faces upward, the opening is covered by the lower surface of the edge portion of the second housing component and the fixing component does not come into contact with the seal member.

* * * * *